Figure 1:
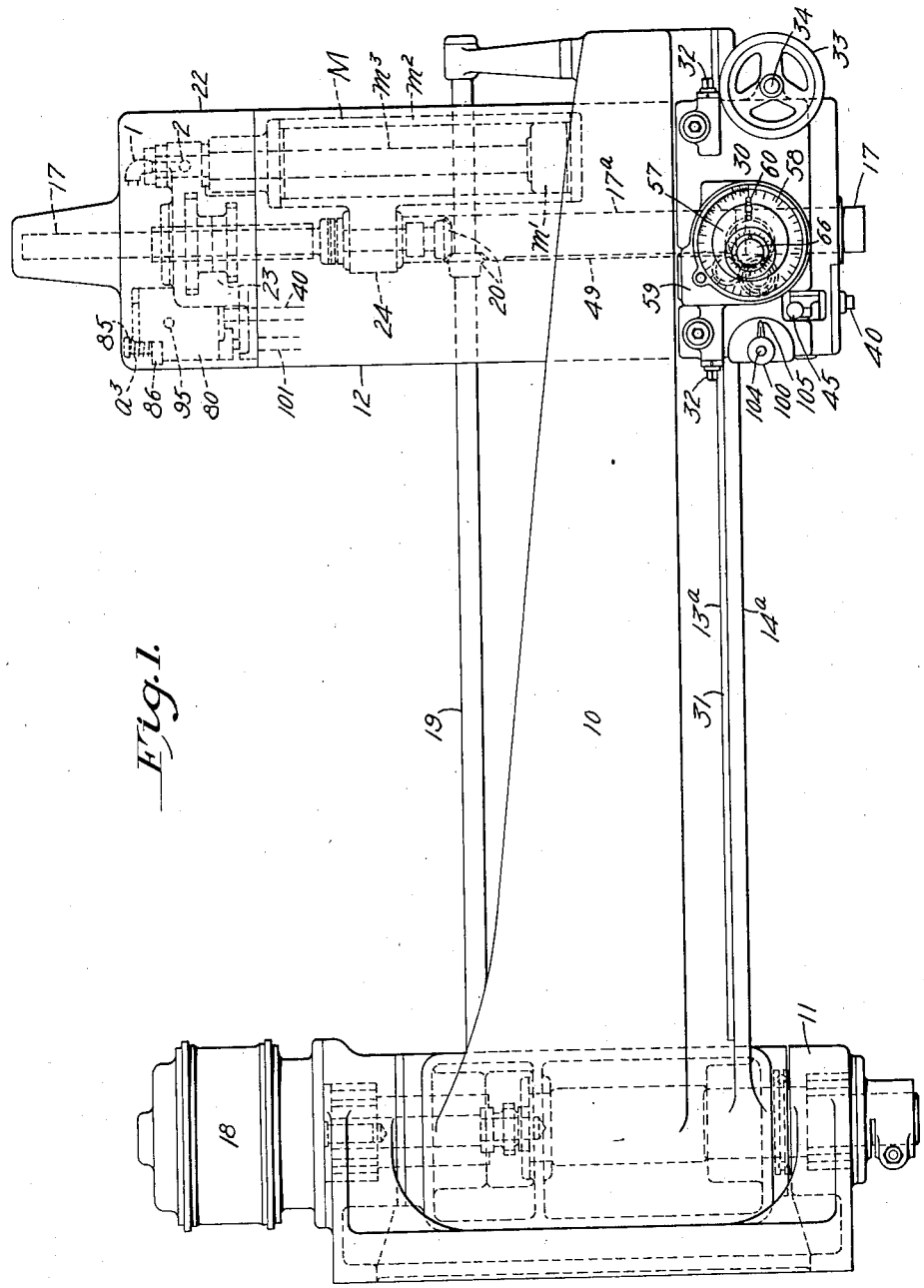

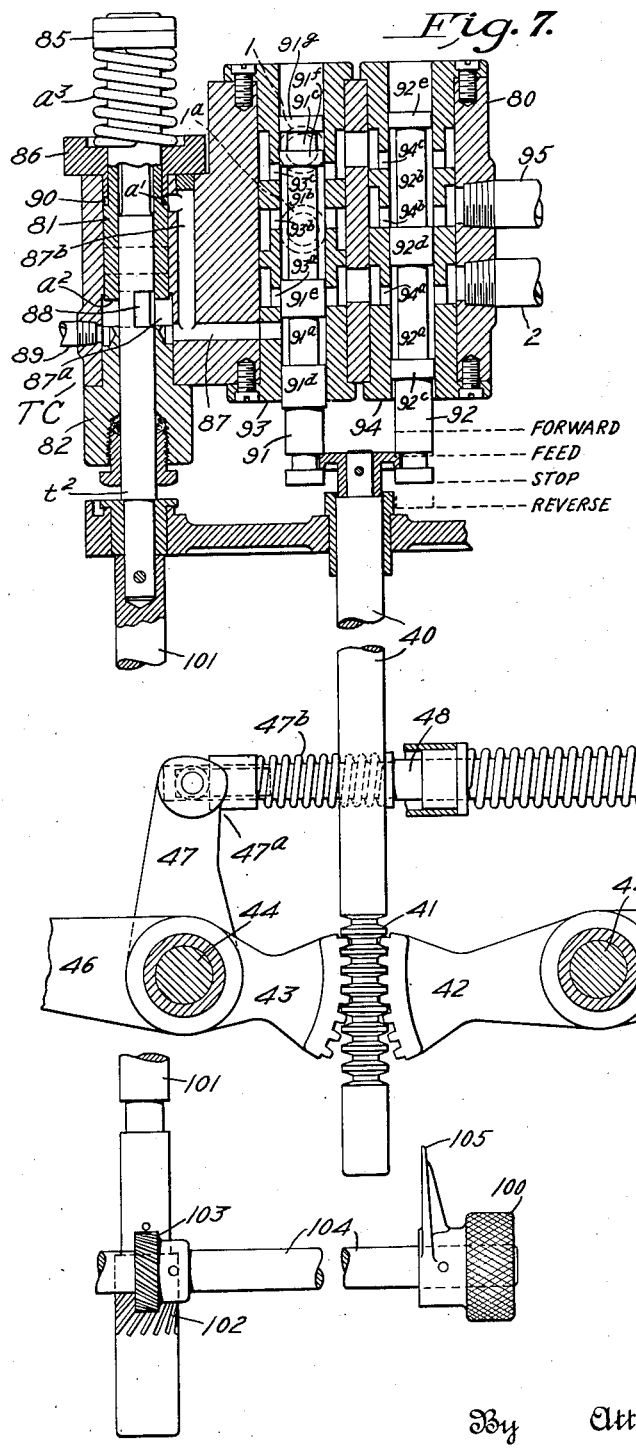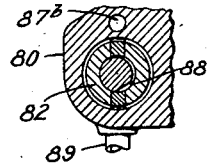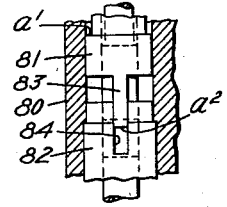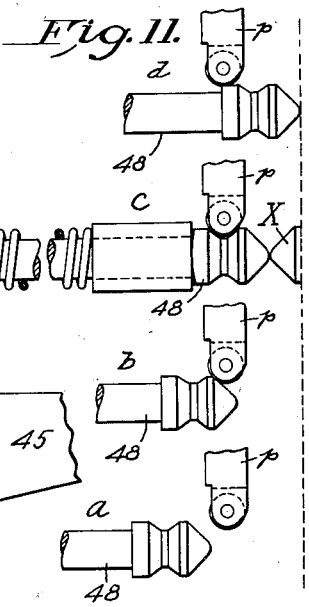

May 7, 1935.  L. L. SCHAUER ET AL  2,000,421
DUPLEX CONTROL FOR RADIAL DRILLS
Original Filed April 30, 1931  7 Sheets-Sheet 6

Inventors
Lawrence Lee Schauer
Augustus M. Sosa
By Attorneys John H. McKewen
Nathan, Bowman & Helferich Patented May 7, 1935

2,000,421

UNITED STATES PATENT OFFICE 2,000,421

DUPLEX CONTROL FOR RADIAL DRILLS

Lawrence L. Schauer, Augustus M. Sosa, and John H. McKewen, Cincinnati, Ohio, assignors to The Cincinnati Bickford Tool Company, Cincinnati, Ohio, a corporation of Ohio Original application April 30, 1931, Serial No. 534,032. Divided and this application August 5, 1932, Serial No. 627,620

18 Claims. (Cl. 77—27)

This invention relates to metal working machine tools and more particularly to drilling machines such as illustrated and described in our co-pending application Serial No. 534,032, filed April 30, 1931, of which this is a division.

The present invention has for its primary object to provide a simplified transmission mechanism for effecting selectively feed and traverse movements between the work and tool spindle, constructed as to be automatically controlled and manually controllable from opposite sides of the machine thereby to enable the operator to govern the movement of the spindle, whether he be stationed at the front or rear of the machine organization.

When setting up new pieces and during the tooling operation, it is important that the parts be properly and accurately mounted. It is also important that the operator be able to observe the cutting action of the tools and be prepared to make such adjustments to the machine as may be necessary during the course of the operation. Accordingly, this invention undertakes to provide an improved system of spindle controls whereby the operator may adjust and control the spindle movements from a plurality of positions thereby to facilitate and expedite setting up operations and also to enable the operator to exercise greater care and supervision over the cutting tool or tools during the course of the tooling operation.

Another object of this invention is to provide a machine tool, such as, for example, a radial drill, with means for accurately and rigidly supporting a translatable head member adjacent the region thereof receiving the greater proportion of the thrusts and stresses incident to a metal cutting operation, and by way of further refinement to provide an arm with guideways and bearing surfaces arranged as to provide a balanced support normally tending to maintain the head and arm members in accurate alignment without the necessity of employing auxiliary devices for that purpose.

A further object of the present invention is to embody in a machine tool of the radial drill type an hydraulic transmission for propelling the tool spindle that is carried entirely by or within the translatable head member and thus eliminate external reservoirs, flexible conduits and connections, etc., all of which tend to interfere, to a large extent, with the normal operation of the machine, take up additional floor space, and are potential, if not constant, sources of leakage of fluid, which, because of its nature, creates slippery and dangerous surfaces around the machine.

In the attainment of the objects of this invention, we propose to construct the arm member of a radial drill in a manner whereby a longitudinally extending aperture is provided therein through which the drill spindle projects, each side of the aperture being substantially box-shaped in vertical cross-section and having L shaped guides and bearing surfaces formed along its lower outer edge. The translatable head member is adapted to be inserted into the longitudinal opening and is provided with bearing brackets that project outwardly under the arm sections and overlie the upper faces of the guideways and serve to guide, as well as to support, the tool head upon the arm.

The omission of the conventional and costly feed change gears, clutches and shafting from the tool head and the substitution of a variable feed hydraulic motor allows ample space within the head for a fluid reservoir, rate and direction control valves, conduits and a pump mechanism, if desired. The bi-tubular formation of the arm, in addition to the fact that a more rigid and inflexible support for the head is thereby provided, renders possible the use of one or more of the box-like sections as an auxiliary or supplemental reservoir as well as a housing or guard means for the arm shaft or other moving parts.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
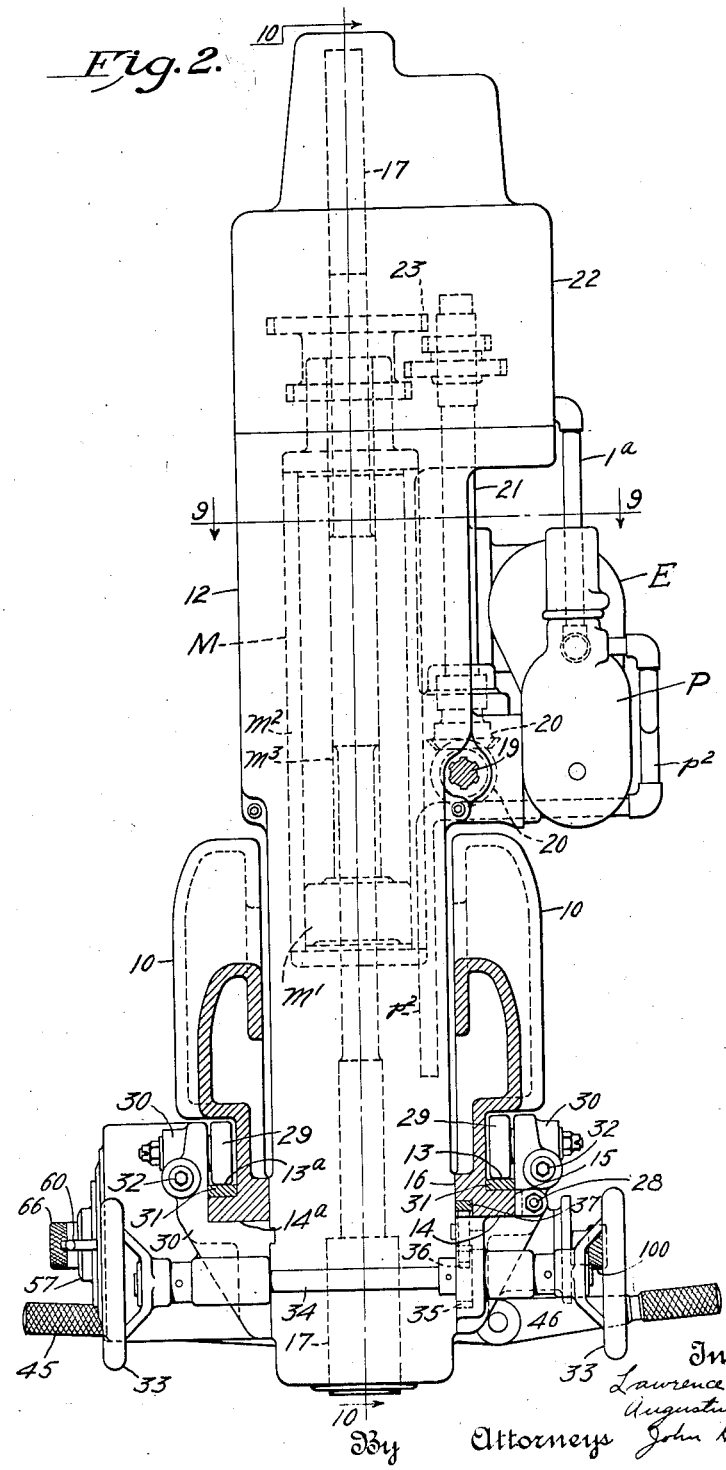
Figure 3:
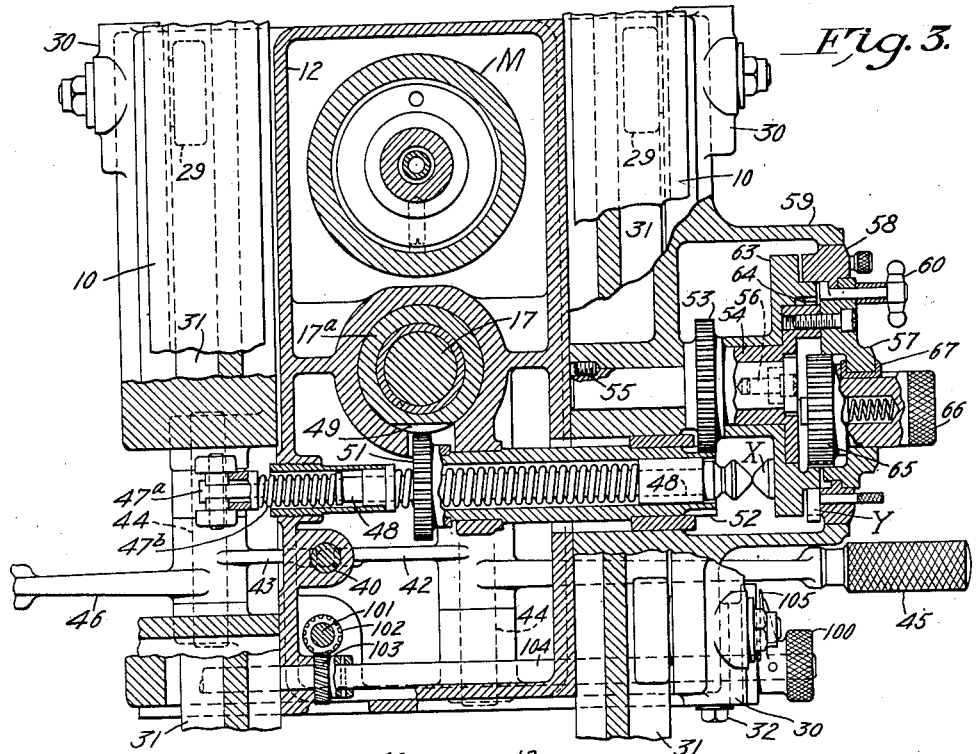
Figure 4:
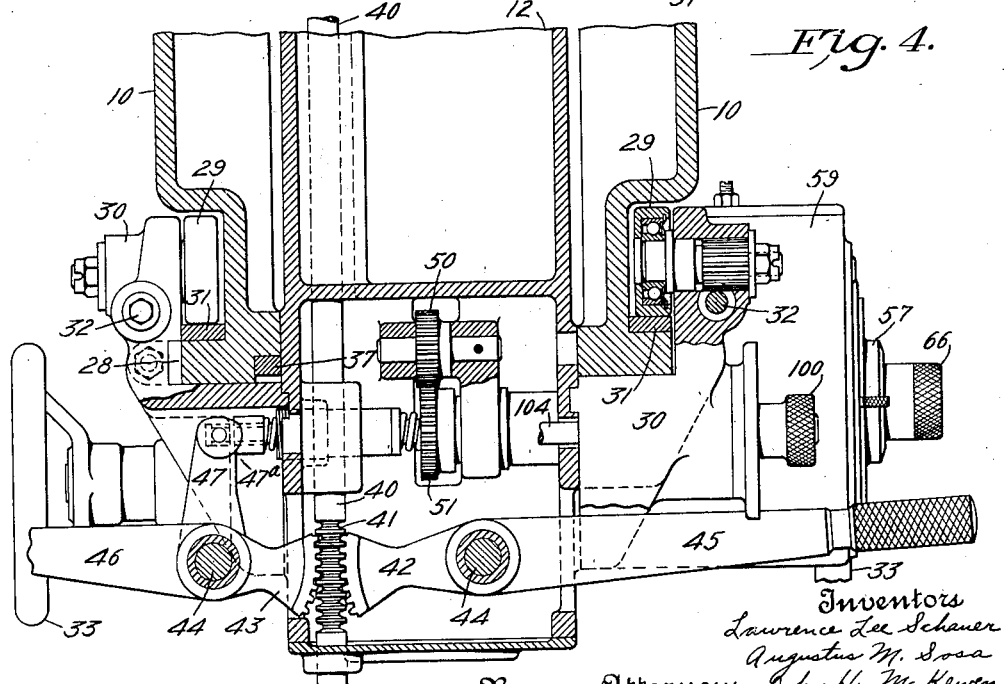
Figure 5:
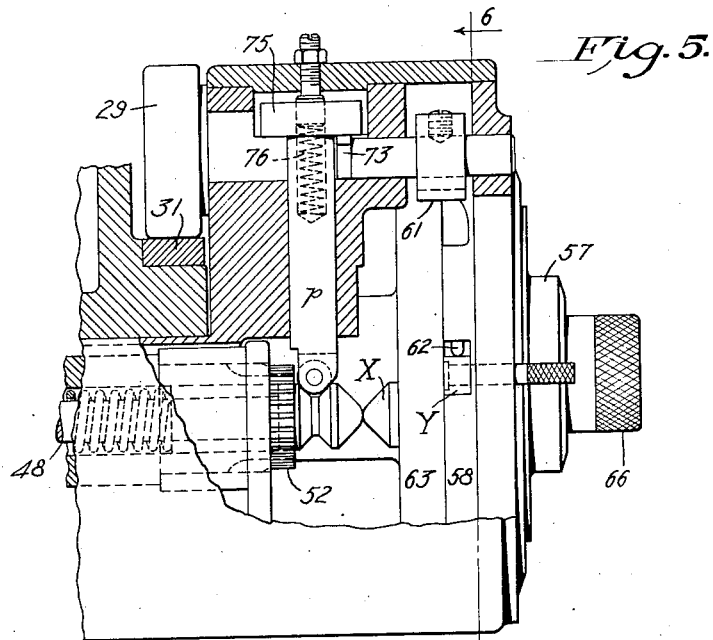
Figure 6:
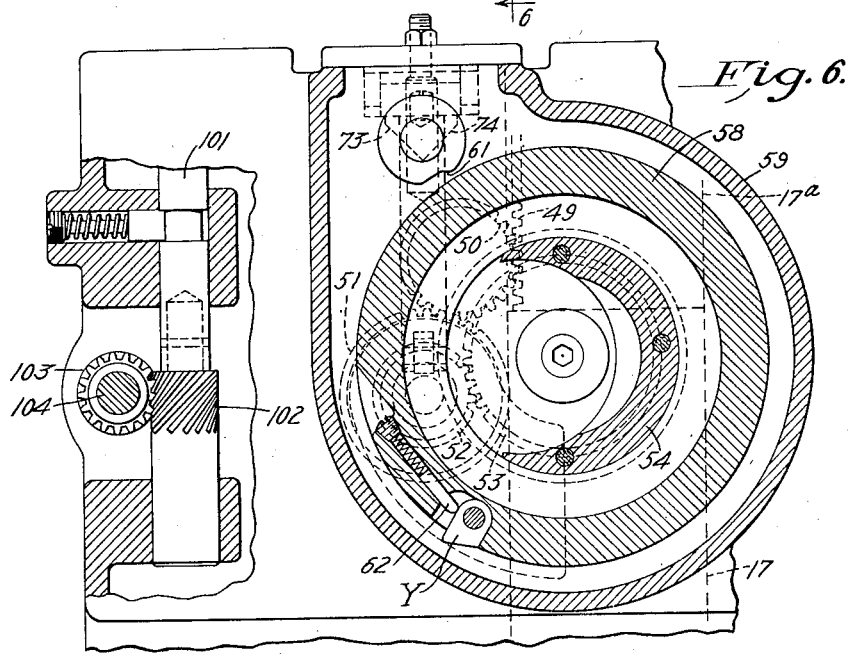
Figure 8:
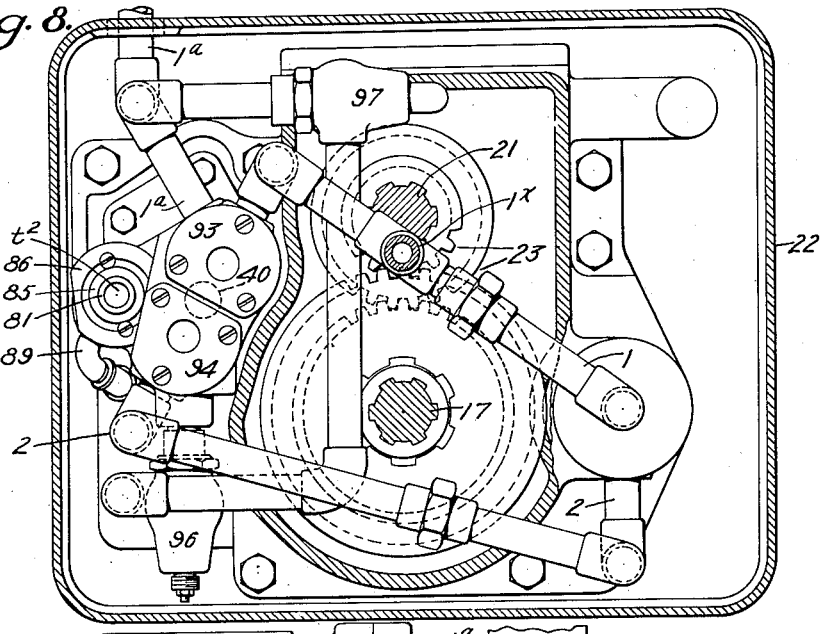
Figure 9:
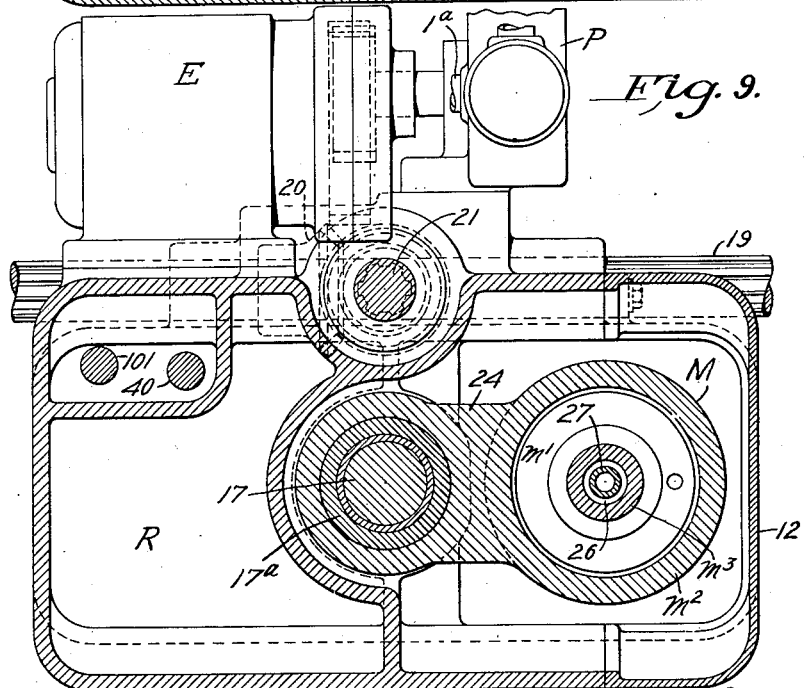
Figure 10:
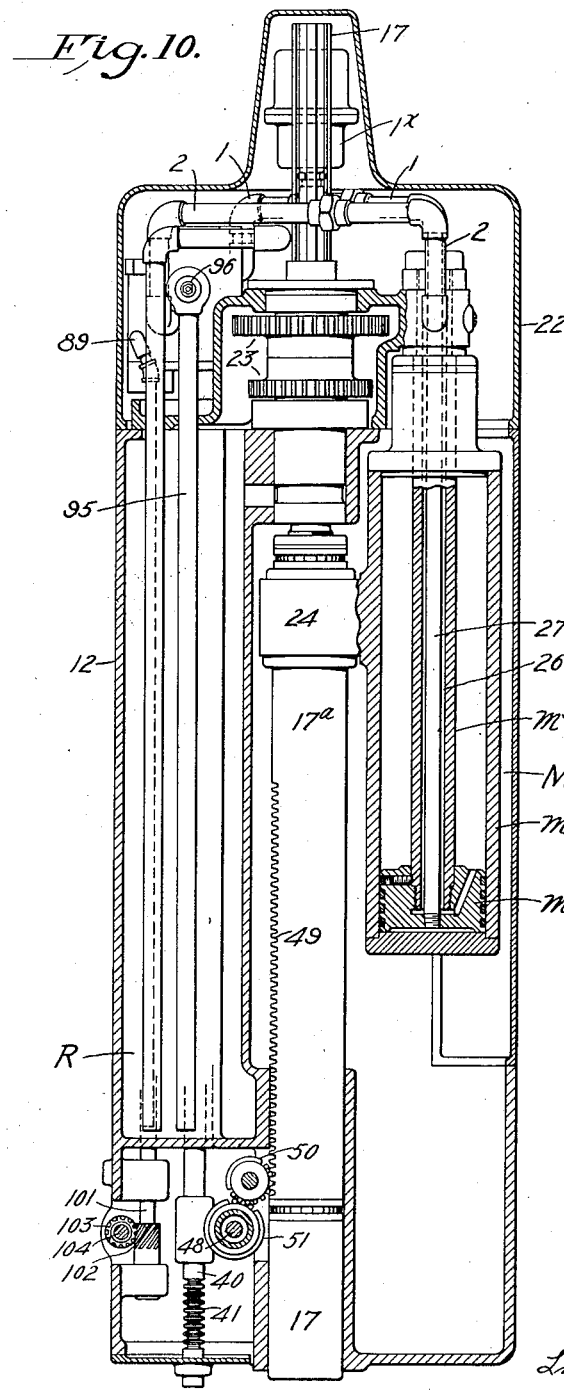

Figure 1 is a side elevation of a radial drill incorporating the present invention. Fig. 2 is a right end view thereof with portions of the arm in section better to illustrate the structural features thereof and the improved head mount. Fig. 3 is a horizontal section through the feed dial illustrating the parts in a neutral or stop position. Fig. 4 is a fragmentary side view of the lower portion of the head and arm. Fig. 5 is a fragmentary view partly in section, of portions of the controller and the trip latch mechanisms in the positions assumed when the tool spindle is at rest. Fig. 6 is a sectional view substantially through line 6—6 of Fig. 5, illustrating the relative positions of the trip dogs. Fig. 7 is a development of the rate and direction control valve mechanism when in a feed position. Fig. 8 is a plan view of a portion of the drill head illustrating the relative positions of the control valves with respect to the tool spindle and hydraulic motor. Fig. 9 is a section substantially along line 9—9 of Fig. 2. Fig. 10 is a vertical section along line 10—10 of Fig. 2. Fig. 11 is a diagrammatic illustration of the respective positions assumed by the controller shaft during a normal operating cycle. Figs. 12 and 13 are detail views of portions of the rate controlling valve means.

Referring more particularly to Fig. 1, it will be noted that the radial drill therein shown is adaptable for mounting on a vertical support or wall and at whatever height desired. It will be understood, however, that the arm may be rotatably mounted on a post or column as is conventional with this type of machine and that the drawings forming a part of this disclosure are merely representative of one form.

In this disclosure the arm 10 is journaled in a bracket 11 so as to swing laterally over the workpieces. A drill head 12 is guided along the arm by guideways 13, 14, 15 and 16 and carries a rotatable and translatable spindle 17 journaled therein. Power to rotate the spindle proceeds from a prime mover 18, or other suitable source, to the arm shaft 19, thence through the bevel gears 20, or reversing clutch if the arm shaft is uni-directional, to the drive shaft 21 that enters the head. A speed change gear box 22, carried in the head, houses suitable change gears, indicated generally as 23, for driving the spindle 17 at various speeds.

Power for effecting translatory movements of the spindle is provided by a hydraulic motor M which comprises a piston $m^1$ a cylinder $m^2$. One of the elements of the motor, preferably the cylinder $m^2$, is connected as by the bracket 24 to the spindle sleeve 17ª. The other element of the motor, namely the piston rod $m^3$ is rigidly connected to a portion of the drill head and is provided with double fluid conduits 26 and 27. One conduit 26 connects with the smaller end of the motor (the end that the piston rod occupies) while the other conduit 27 connects with the larger end of the motor (see Fig. 10). Fluid under pressure for actuating the motor is supplied by a pump P selectively to either end of the motor as will later be described. It may be noted here that by providing a hydraulic motor for translating the spindle a large number of costly change gears have been eliminated and in the absence of change gears ample room remains within the head for the embodiment of a liquid reservoir, hydraulic motor, etc.

The L-shaped guide-ways for the head are formed at the lower edges of the bifurcated arm 10 for supporting and guiding that member at the lowermost portions adjacent the points receiving the tooling stresses. Narrow guides 15 and 16, extending longitudinally of the arm, take the lateral thrusts, guideways 13 and 14 and 13ª and 14ª take the vertical thrusts, and, in addition, prevent the head from tipping front to back. In this manner, it will be seen, that the spindle head is supported and accurately guided under all conditions.

The entire weight of the head is carried by rollers 29, positioned on either side of the head and at the extreme points thereof, and which are eccentrically mounted and adjustable in the brackets 30. Wear plates 31, detachably secured to the arm-ways, provide accurate and aligned surfaces upon which the head rollers bear. Upward thrusts upon the spindle are transmitted directly to the lower guide or guides 14 and 14ª which afford a positive metal-to-metal contact with the bracket members 30 when under load. Wear on the square locked guides is readily compensated for by adjusting the gib 28 which corrects for any lateral misalignment of the carrier; and by adjusting the rollers 29 by means of the screws 32, correction may be made for any wear on the guides 13—14 or 13ª—14ª or error in the vertical alignment of tool head. Thus it will be seen that the low square locked guides result in a low hung head and provide the accurate supporting surfaces necessary for machines of the character and which may be easily and accurately machined with a minimum of expense.

Mounting the head on rollers has the additional advantage of minimizing the power required to translate the head along the arm and which is accomplished in this instance by means of the duplex arranged hand wheels 33, shaft 34, gears 35 and 36, the latter of which meshes with teeth of a rack 37 carried on the inner side of the arm where it is impossible for any dirt or other foreign material to collect and interfere with the traversing mechanism.

The semi-bi-tubular arm also is a departure from conventional design and is so constructed as to provide additional strength and is, therefore, less liable to deflection or distortion under heavy loads. Each side of the arm provides ample room for enclosing the arm shaft or other driving mechanism as well as a chamber or chambers of ample proportions for the reception of coolant, lubricant for the gears or shafting, or a reservoir for the propelling fluid, if desired.

Fig. 2 illustrates more clearly the narrow proportions of the arm and head whereby the operator may closely approach the spindle from either side and thereby is enabled to exercise accurate supervision over the tooling operations and is enabled to manipulate the controls in an easy and efficient manner. Either side of the machine being the control side saves the time of the operator in passing from one side to the other and which doubles the utility of the machine and increases its productive capacity.

Feed control

The feed control mechanism illustrated more particularly in Figs. 3 to 7 will now be explained. As heretofore mentioned, the feeding of the spindle is effected by hydraulic means and which is controlled by suitable valves, later to be explained in detail. Suffice it for the present that the direction control valve is actuated by a vertically arranged shaft 40 which has annular rack teeth 41 formed near its lower end. The teeth 41 are engaged by the gear teeth of arcuate members 42 and 43 which are pivoted at 44. Manually operable levers 45 and 46, projecting outwardly on either side of the head, control the position of the valve rod 40 and the positioning of the valves. Shifting of the valve rod is also effected automatically by means of the lever 47 and controller shaft 48 as will now be explained.

The spindle sleeve 17ª is provided with rack teeth 49 that drives a pinion 50 in mesh with a gear 51 secured to a sleeve journaled coaxially with the controller shaft 48. The other end of the sleeve has gear teeth 52 formed thereon which mesh with the teeth of a gear 53 keyed to a drum 54. Gear 53 and drum 54 are retained in place by means of the studs 55 and 56. The drum 54 carries a plate member 57 rotatably mounted in grooves provided by a rotatable disk 58 and which is provided with graduations or indicia marks formed on the outer face thereof for indicating the stroke of the spindle.

The disk 58 revolves in bearings provided by the housing 59 and has secured thereto a feed trip dog Y which is effective in one direction only, that is, when the spindle is feeding down. When the spindle is moving downwardly the dial plate 58, which has been clamped by means of the hand screw 60 to the disk 57 in a preselected position, is turning clockwise as viewed in Fig. 1, the dog Y is adapted to engage a rock cam 61 to trip out the feed and reverse the direction of movement of the spindle when the proper depth is reached. A push pin 62 maintains the dog Y in an operative position as shown in Fig. 6.

Coaxial with the drum 54 is a disk 63 that carries a stop dog X which is mounted on the inner face of the plate and so positioned as to directly engage the controller rod 48 and move it to the neutral or stop position at preselected intervals. The disk 63 is clutched to the disk 57 by means of the gear teeth 64 and wide faced gear 65 so that any movement of the spindle causes rotation of all of the members 57, 58 and 63 and the trip dogs carried thereby.

The gear 65 is pressed inwardly by means of the hand grasp 66 and thereby declutched from the disk 57. It may then be turned in either direction until the pointer 67 carried thereby coincides with the proper graduation on the dial 57, and then released. The dog X being adjustable in this manner limits the height or extent of upward movement of the spindle.

It will be noted that short levers 73 and 74 are provided on the end of the rocker shaft which engage the under surface of a collar 75 carried by the latch pin $p$. Resilient means such as a spring 76 fitted within the bore in the latch pin urges the latter downwardly against or into the path of movement of the controller rod 48 and also maintains the collar 75 in engagement with the two levers of the rocker arm. However, if the controller 48 is in the position $b$, Fig. 11, when the emergency arises to reverse and stop the spindle immediately, the operator raises the control lever 45 and the shaft 48 moves to the position $d$, the valves are then positioned so as to direct fluid to the opposite end of the motor M and the spindle recedes rapidly. As it nears its uppermost position, the dog X engages the end of the controller shaft and moves same to the stop position indicated in Fig. 5 or position $c$ Fig. 11.

The reversing dog Y is also adjustable for regulating and controlling the depth of hole or duration of feed. This adjustment is readily effected by releasing the clamp screw 60 and by turning the dial plate 58 until the proper indicia mark thereon coincides with a zero mark carried by a frame 59. The dial plate 58 is then clamped to the drum 57 and the machine is again ready for operation.

Hydraulic system

This invention presents an improvement over the hydraulic systems heretofore designed for the propulsion of machine elements and one that may be incorporated in the motor discharge line or the supply line. It is recognized that hydraulic systems of the discharge regulated type have numerous advantages over the other type of system, the supply regulated type, one of them being that overrunning of the tool or work carrier is prevented because the carrier cannot accelerate or move any faster than the rate at which fluid is permitted to be discharged from the motor. However, if a throttle is placed in the discharge line or the back pressure line, it has been found that an increase in the work resistance encountered by the motor effects a corresponding reduction in the pressure in the exhaust side thereof and an increase in the pressure in the supply or forward pressure lines. The converse is true when the work resistance decreases, for, under these circumstances, there is a tendency for the hydraulic motor to accelerate and thereby produce an increase in the pressure in the back pressure lines. Consequently, the quantity of fluid passing the restricted opening or throttle will vary proportionately as the pressures, the resulting effect of which is to produce an unsteady, varying rate of movement of the propelled element.

This invention undertakes to overcome and correct this undesirable action by providing an automatic variator for regulating and adjusting the size of the orifice in accordance with variations in the pressure of the controlled fluid thereby to produce an even and uniform rate of movement. Figs. 7, 12 and 13 represent a preferred form of a device responsive to variations in the fluid pressure for automatically maintaining a constant rate of feed under varying values of work resistance, in combination with means for initially determining the rate of flow under a given pressure condition.

This device comprises a casing 80, a rotatable valve stem $t^2$ closely fitted within a bore formed in a sleeve-like member 81 and bushing 82 mounted in the casing. The sleeve 81 is provided at its lower end with projecting tines or tongues 83 which fit closely within slots 84 provided by the bushing 82. Resilient means such as a spring $a^3$, interposed between a collar 85 adjustably carried by a projecting portion of the sleeve 81, and a cover member 86, urges the sleeve outwardly thereby to increase the gap or aperture thus formed between the ends of the tongues 83 and the bottoms of the slots 84. Fluid discharged by the motor, when feeding, enters the gateway 87ª through the port 87 and flows around a reduced portion 88 of the valve stem $t^2$ and thence through the conduit 89 to the reservoir. The reduced portion 88 is eccentrically formed and lies adjacent the gates in the valve so that any angular movement of the valve stem will increase or decrease the size of the orifice and thus resistance to the flow of fluid through these ports thereby to control the rate of discharge from the motor.

Ordinarily, under a given condition of pressure, the rate of flow through the valve will be constant for any given setting of the valve stem. However, since the pressure of the regulated fluid varies with the work resistance, as hereinbefore explained, the quantity of fluid passing the resistance 88 will likewise vary and thereby cause variations in the rate of movement of the motor and parts associated therewith and to overcome this condition automatic means are provided for correcting or varying the size of the orifice in accordance with variations in the fluid pressure. With that end in view the sleeve 81 is formed with a reduced portion which provides an annular piston-like area $a^1$ and which is also connected with the back pressure line 87 by means of the conduit $87^b$. Fluid pressure entering the chamber 90 and acting upon the annular area $a^1$, tends to move the valve sleeve 81 in the direction closing the gateway $87^a$, in opposition to the action of the spring $a^3$ and the fluid pressure acting upon the undersides of the tongues 83.

With respect to a given pressure condition, the effective areas of the surfaces $a^1$ and $a^2$ and the characteristic of the spring $a^3$ may be calculated or adjusted to maintain the valve sleeve in equilibrium thereby to maintain a given size opening at $87^a$. Any variation in the fluid pressure occurring thereafter will immediately unbalance the valve and cause the sleeve 81 to move and vary the opening $87^a$ until a state of equilibrium is again reached. Thus, if the fluid pressure in the conduit 87, and shunt line $87^b$ increases the resultant of the forces acting upon the valve sleeve 81 moves the latter in a direction tending to close the aperture $87^a$, the effect of which is to maintain constant a given volume of fluid discharged from the exhaust side of the motor even though the pressure increases. Conversely, if the pressure in the back pressure lines 87 and $87^b$ drops, the valve sleeve 81 is again thrown out of equilibrium and moves in a direction tending to open the port, to bring about a constant discharge at the lower pressure. It will be seen, therefore, that the foregoing mechanism, although it performs a complicated service, it is extremely simple, reliable and entirely automatic in the performance of its function in maintaining an even and uniform rate of feed.

The selector valves are, to facilitate the machining and assembling of parts, housed in the same casing 80 as the variator mechanism just described, the essential parts being the valve plungers 91 and 92 and valve sleeves 93 and 94. The valve plunger 91 is provided with three reduced portions $91^a$, $91^b$ and $91^c$ which terminate in the raised lands $91^d$, $91^e$, $91^f$ and $91^g$, while the valve plunger 92 is provided with two reduced portions $92^a$ and $92^b$ and the lands $92^c$, $92^d$ and $92^e$. The valve sleeve 93 is provided with radial bores or channels $93^a$, $93^b$ and $93^c$ which are adapted in certain positions in the valve stem 91, to be placed in communication with similar ports $94^a$, $94^b$ and $94^c$ of the adjacent valve sleeve, to effect a preselected rate or direction of movement of the drill spindle.

*Forward traverse*

To effect movement of the spindle forward at a rapid rate the valves are moved to the "forward" position indicated in Fig. 7 and fluid under pressure passes from the pump P through conduit $1^a$ to chamber $93^b$, around a reduced portion $91^b$ of the valve stem, to chamber $93^c$ thence through the forward pressure line 1 to the larger end of the slidable cylinder $m^2$ whereupon the latter is caused to move forward or toward the work at a relatively rapid rate. Fluid discharged by the smaller end of the cylinder passes through line 2, channel $94^a$, around reduced portion $92^a$, to channel $94^b$, and thence through conduit 95 to the reservoir. A pressure relief valve 96 is placed in this line to maintain the system charged and to provide sufficient back pressure to prevent undue acceleration or overrunning of the parts.

*Feed*

So long as the operator continues to hold the control lever in the rapid traverse position the spindle moves at a relatively rapid rate as the work is approached. However, prior to the engagement of the tool and work the lever is moved to the feed position. The pressure fluid from the pump P now passes through channel $93^b$ around reduced portion $91^b$ to the larger end of the motor in the same manner as explained during the "approach" position of the valves. The fluid discharged by the motor, instead of passing to the reservoir through the check valve 96, passes through conduit 2, channel $94^a$, to channel $93^a$, which, during this position of the valve stem 91, is in communication with the conduit 87 previously referred to. The back pressure fluid is thereby directed through the throttle valve TC, as hereinbefore explained, and out conduit 89 to the reservoir. To avoid unsteadiness in action, caused by entrained air, an air bleeder $1^x$ is provided in the forward pressure line 1, preferably at the high point, and removes or by-passes such gases that may be carried by the liquid.

A hand wheel 100 located on each side of the tool head provides the means for adjusting the angular position of the rate control valve stem $t^2$, as follows: The lower end of the valve stem $t^2$ is secured to a shaft 101 which is provided intermediate its ends with spiral gear teeth 102. A similar gear 103 carried by the rate control shaft 104 meshes with the gear teeth 102 to effect rotation of the valve stem to vary the value of the resistance at 88. A pointer 105 carried by the hand wheel 100, in combination with a suitable dial plate, indicates the various settings to effect preselected rates of feed.

*Return traverse*

To bring about a return movement of the tool head, the valves are withdrawn from the sleeves further and direct pressure fluid through channel $93^b$, reduced portion $91^b$, channel $93^a$ to channel $94^a$ to conduit 2 and the smaller end of the cylinder $m^2$ whereupon the cylinder $m^2$, and parts associated therewith, are retracted at a rapid rate. The fluid discharged from the opposite end of the cylinder during this period passes back through line 1, channel $93^c$, around reduced portion $91^c$, through channel $94^c$, around reduced portion $92^b$, to channel $94^b$ and then, through line 95 and relief valve 96, to the reservoir.

*Stop*

The spindle continues its upward movement until the trip mechanism again operates to shift the valves to the "stop" position. When in the stop position fluid under pressure passes through line $1^a$ through channels $93^b$, $93^c$ and line 1 to the larger end of the motor and also through channel $94^c$, around reduced portion $92^b$, through channel $94^b$, to the exhaust line 95. It will be noted that in this position of the valves the fluid is entrapped in the discharge side of the motor, that is, conduit 2 leads into channels $94^a$ and $93^a$, but as these are closed off from all other means of exhaust there is no flow of fluid out of the motor discharge line and the parts are held at rest. A relief valve 97 placed in the forward pressure line prevents the pressure therein from exceeding a predetermined maximum.

Referring more particularly to Figs. 2, 7, 8, 9 and 10, it will be observed that the entire hydraulic transmission, including the pump, motor, valves and reservoir, is carried by and translatable with the drill head 12. The pump P is mounted at the back of the head and may be driven from the arm shaft 19 by conventional driving mechanisms or be independently driven as by a motor E. The pump draws fluid from the reservoir R through line $p^2$ and discharges it into line $l^a$ and thence to the valve mechanism 80 located within the drill head casing. Inasmuch as it is practically impossible to avoid slight leakages of fluid at various parts of the system and particularly around the moving members of the valve, the above arrangement is designed so that whatever leakage does take place, the same will drip back into the reservoir and not over the exterior of the machine and on the floor.

Operation

At the start of the operations the machine is at rest and the parts are in neutral or stop position as illustrated in Figs. 3, 5 and 7. The operator loads the machine and moves the control lever 45 downwardly to its extreme position. This movement, through the mechanism heretofore explained, shifts the valves to the rapid traverse forward position and fluid is thereby directed to the larger end of the hydraulic motor and the spindle moves toward the work at a rapid traverse rate. The operator continues to hold the lever down until the tool carried by the spindle is about to enter the work at which time the lever is moved upwardly one position, the "feed" position. The valves then are moved to the position marked "feed" in Fig. 7, and the fluid from the exhaust side of the motor is directed through the variator, thus materially reducing the rate of movement of the spindle. At this time the controller or plunger 48, which, during the rapid traverse position of the valves was retracted to the position $a$, (Fig. 11), now advances to the position $b$ against the pawl $p$. Rapid traverse movement of the spindle stops and the spindle continues forward at a slow rate or the feed rate selected until the dog Y, which has been previously set for the depth hole required, engages the rocker mechanism and elevates the tripping pawl $p$ so that the controller or plunger 48 advances to the position $d$, illustrated diagrammatically in Fig. 11. The advancing of the controller to this position moves the valves to the spindle reversing position thereby reversing the fluid connections to the motor and the spindle recedes rapidly. The movement of the dial plate 63 also reverses until the dog X engages the end of the plunger rod 48 and moves the same to the stop position, position $c$, Fig. 11, permitting the latch-pawl to drop into the notch formed at the end of the plunger.

When the plunger is moved to this position, the valves are likewise moved to the "stop" position, thereby blocking the motor discharge and by-passing the supply fluid to the reservoir. Hence the spindle comes to rest at the upper end of its stroke.

In the event that it becomes necessary for the operator to reverse the movement of the spindle before the desired depth hole is reached, all that is necessary to be done is to elevate the control lever to its uppermost position which shifts the shaft 48 to position $d$ and the valves to the rapid traverse reverse position, the spring $47^b$ dominates the spring of the latch-pawl $p$ so that the controller 48 does not stop in its neutral position.

The lost motion connection $47^a$, between lever 47 and controller 48, permits independent operation of the levers for reversing when dog X is aligned with shaft 48, while the resilient means, such as the spring $47^b$, normally maintains the parts in their effective operating positions during the ordinary manipulation of the controls.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A radial drill combining an arm member, said arm being divided longitudinally and provided with L-shaped flanges along the lower outer edges thereof; a tool carrier disposed between the sides of said divided arm; means mounting said carrier on said flanges comprising bracket members secured to said carrier at the lower portions thereof and adapted to project outwardly and upwardly therefrom into engagement with the under and side faces of said L-shaped flanges; anti-friction rollers journaled in and adjacent the ends of said bracket members for engagement with the upper surfaces of the flanges; and compensating means including eccentrically formed journal bearings for said rollers and means for actuating each of said journals independently to move said rollers toward or away from said flanges.

2. In a radial drill the combination of a one piece arm member adapted to be pivotally supported at one end, the free end of said arm being divided longitudinally thereby forming front and rear arm sections with an elongated aperture therebetween adapted to receive a tool head, and depending guide ways formed solely upon the lower edges of said front and rear arm sections and providing the sole support and guide bearings for the tool head adapted to be suspended in the aperture between said sections, said guideways being substantially L-shaped in section having their toe portions arranged in opposed relation in the same horizontal plane one on each of said arm sections.

3. A radial drill combining an arm member having an elongated aperture formed therein of a width sufficient to receive a translatable tool head said arm being also provided with two longitudinally extending parallel guideways depending from the lowermost edges of said arm member adjacent said aperture, said guideways affording the sole support and guide means for the tool head and each of said guideways being formed with horizontal upper and lower bearing surfaces and one of said guideways being formed with vertical inner and outer bearing surfaces; said horizontal upper and lower bearing surfaces on each side of said aperture lying in spaced parallel planes, a translatable tool head disposed within said aperture and supported solely by said depending guideways; and means carried by said head member adjacent the lower portion thereof and extending outwardly therefrom and under said guideways then upwardly and inwardly in engagement with the respective bearing surfaces on each of said depending guideways for guiding and supporting said head member on said bearing surfaces in all of the positions of the head on the said guideways.

4. A radial drilling machine combining an arm member provided with a vertically disposed aperture extending lengthwise thereof; parallel guideways extending along and depending from the underside of said arm member each side of the aperture formed therein; said guideways being L-shaped and arranged in opposed relation in the same horizontal plane, a tool head disposed within said aperture and extending below said under guideways and adapted to be supported solely upon and by said depending guideways; means carried by said tool head operatively engaging said under guideways for guiding and supporting said head on said arm, said means providing the sole support for the tool head on the arm and arranged to maintain the head in vertical and horizontal alignment under idle or working conditions; means for translating said tool head along said under guideways including a toothed rack formed upon the underside of one of the under guideways; and manually operable means carried by said head member at opposite sides of said arm and located below said arm proper for actuating said head translating means from either side of the vertical plane of the arm.

5. An arm structure for supporting a translatable tool head of a radial drill comprising a pair of substantially parallel members spaced apart so as to form a longitudinally extending opening therebetween through which the translatable head is adapted to extend, each of said members having substantially plain inner and outer side walls; longitudinally extending guide elements formed integral with and depending from the underside of each of said members and within the vertical planes of the respective side walls, said guide elements being substantially L-shaped in cross-section and arranged in opposed relation in the same horizontal plane; and bearing surfaces formed upon the upper, lower and outer surfaces of said L-shaped guide elements adapted to receive the entire upward, downward and lateral thrusts of the tool head fitted thereto; and means rigidly maintaining said members in spaced relation.

6. An arm structure for supporting a translatable element of a machine tool comprising a pair of members spaced apart so as to form a longitudinally extending opening therebetween for the reception of the said element, each of said members having a substantially vertical inner and outer side wall and a bottom wall; means maintaining said members in parallel spaced relation with their bottom walls in a single plane; guideways formed solely upon the bottom wall of each of said members adapted to provide the sole support and guide means for the translatable element comprising an L-shaped member integral with and depending from the lower wall of each member and arranged in opposed relation with respect to each other, said L-shaped members being provided with parallel relatively narrow bearing surfaces for receiving the entire upward, downward and lateral thrusts of the translatable element to be supported and guided thereon.

7. In a radial drill the combination of a tool head, a translatable spindle journaled therein; a power transmission for propelling said spindle; rate and direction control means for controlling the action of said transmission thereby to control the direction and rate of movement of said spindle; power means driven by said spindle for actuating said rate and direction control means automatically and in timed relation with the movements of the spindle, including a plunger element operatively connected with said control means adapted when moved to its various positions to impart a similar movement to said control means and thereby effect predetermined changes in the rate or direction of movement of the spindle; a spindle driven trip dial journaled in said tool head at the front thereof and a plurality of trip dogs adjustably mounted on said dial for actuating said plunger; and means located at the rear of said head for actuating said rate and direction control means, comprising an actuating lever projecting rearwardly from said head and affording means for manually controlling spindle movements from the rear of the tool head independently of said automatic means.

8. A drilling machine combining an arm member; a tool head translatable thereon; a spindle journaled in said head; a power transmission for moving said spindle carried by said head; rate and direction control means for said power moving transmission; trip mechanism for actuating and governing the position of said control means including a plunger mechanism, a trip dial and a plurality of trip dogs manually adjustable thereon from the operator's normal side of the tool head and arm for actuating said plunger mechanism and control means in timed relation with the movement of said spindle; and manually operable means located on said tool head at the side of the head and arm opposite the operator's normal side for actuating said control means, said last mentioned means affording means for manually controlling the movements of the spindle from the rear of the machine.

9. A drilling machine combining an arm member; a tool head translatable thereon; a spindle journaled in said head; a power transmission for moving said spindle; rate and direction control means for said power transmission; trip mechanism actuated in timed relation with the movement of said spindle including a trip dial and a plurality of trip dogs for actuating and governing the position of said control means, said trip dogs being adjustable and located at the front of the tool head; and manually operable means located at the rear of said tool head for actuating said control means independently of said trip mechanism said last mentioned means affording means for manually controlling the movements of the spindle from the rear of the machine.

10. A drilling machine combining an arm member; a tool head translatably mounted thereon; a tool spindle translatably journaled in said head; power means for translating said spindle at feed and traverse rates; rate and direction control means for said spindle translating means; trip mechanism for said direction control means including a spindle driven dial and trip dogs thereon, said dial being located on said head at the operator's normal side of the machine; a manually operable shaft extending through said head in a direction transverse to the path of movement of said head for varying the rate of feed movement of said spindle, said shaft having hand-grasps at each end and affording means for changing the rate of feed of said spindle selectively from the operator's normal side of the machine or from the rear side of the machine; and means manually operable from said rear side of the machine for actuating said direction control means independently of said dial mechanism.

11. A radial drill combining an arm; a translatable head member mounted thereon; a spindle carried by said head and translatable relative thereto; means for translating said spindle comprising an hydraulic motor; a pump mechanism for supplying fluid to said motor, a reservoir, valve means and a system of fluid conduits connecting said motor, pump, valve means and reservoir, all of said elements being carried by and translatable with said translatable head member; and means including manually operable control levers located at the front and rear sides of the head member and connections with said valve means for actuating said valve means thereby permitting the movements of said motor and the spindle propelled thereby to be controlled from the rear side of said arm as well as from the front thereof.

12. An arm structure for supporting the tool head of a radial drilling machine comprising a horizontally disposed elongated arm member having a longitudinally extending opening formed therein, each portion of the arm member adjacent said opening being substantially C-shaped in cross-section and having a substantially vertical outer wall and a lower or bottom wall integral therewith; guideways formed upon the exterior surface of each of said arm portions and solely at the lowermost portions thereof, said guideways being arranged in opposed relation and adapted to provide the sole support and guide means for the tool head; a tool head suspended in said opening; and means for translatably mounting the tool head in said elongated opening comprising bracket members secured to opposite sides of the head at the lower portion thereof extending outwardly under said arm portions and adapted to engage the upper, lower and side portions of said opposed L-shaped guideways and to transmit thereto the entire vertical and lateral thrusts of the tool head.

13. A radial drill combining an elongated horizontally disposed arm member, said arm being divided longitudinally and provided with guideways solely along the lowermost edges thereof; a tool carrier member disposed between the sides of said divided arm; means mounting said carrier member on said guideways comprising bracket elements secured to said carrier at the lower portions thereof and adapted to project outwardly under said arm portions and upwardly into engagement with the under and side faces of each of said guideways, anti-friction devices disposed between the top faces of said guideways and said brackets adjacent the ends of said bracket members; wear and alignment compensating means for said anti-friction devices; and manually operable means located at opposite sides of said elongated arm member for translating said tool carrier along said guideways from the operator's normal position at the front of said arm or from a position at the rear of said arm.

14. A machine tool combining a translatable head member; a spindle translatably journaled in said head; power transmission means for translating said spindle in said head comprising an hydraulic motor, a pump for supplying fluid to said motor, a fluid reservoir, valve means for controlling the rate and direction of flow of fluid to said motor, including a first movable element adapted upon movement to a predetermined position to change the rate movement of said motor from a traverse rate to a feed rate or when moved to another position to change the direction of movement of said motor, a second movable element operatively connected with said valve means adapted, when actuated, to vary the rate of the feed movement of said motor; manually operable means for actuating each of said movable elements, each of said manually operable means including a control lever located at and projecting from the rear side of said head member and provided with a hand grasp whereby the operation of said power means may be controlled from the rear side of the machine tool.

15. In a drilling machine having an arm member, a tool head translatable therealong, and a tool spindle translatably journaled in said head, means for effecting and controlling the translatory movements of said tool spindle comprising an hydraulic transmission system including a source of liquid pressure, an hydraulic motor and a reservoir carried wholly by said head member for propelling said spindle in reverse directions at predetermined rates, a selector valve in said system for directing the flow of liquid selectively to opposite sides of said motor or to said reservoir and a manually regulatable resistance valve in said system for controlling the rate of movement of the motor, a trip mechanism operable by and in timed relation with the movements of said spindle for actuating said selector valve mechanism automatically, said trip mechanism being manually adjustable from the normal operating side of the machine; and a plurality of control elements operatively connected with said selector valve and with said resistance valve located at and operable selectively from the rear side of said translatable head member and of said arm member for controlling selectively the direction and rate of movement of said spindle independently of said trip mechanism.

16. A radial drill combining a horizontally disposed arm member said arm being divided longitudinally and provided with opposed L-shaped flanges depending from the lower edges thereof; a tool carrier disposed between the sides of said arm and translatably supported on said flanges; means mounting said carrier on said flanges comprising bracket members provided by said carrier at the lower portions thereof adapted to engage the under and side faces of said opposed L-shaped flanges; means carried by said bracket members adapted to engage the upper surfaces of said flanges for transmitting thereto the entire downwardly acting thrusts of said tool head; and wear plates removably secured to said upper surface of each of said flanges for receiving said downward thrusts, said wear plates being adapted to be removed and replaced by others when the friction incident to moving said head thereon causes said plates to become worn.

17. A radial drill combining an arm member divided longitudinally and provided with opposed L-shaped relatively narrow guideways depending from the lower edges thereof said guideways forming front and rear guides each having relatively narrow upper and lower bearing surfaces; a tool head translatably mounted upon said arm and disposed between the sides thereof; means mounting said head upon said depending guideways comprising bracket members projecting outwardly from each side of said head at the lower portion thereof and under said arm and adapted to engage the lower and upper horizontal bearing surfaces of both of said L-shaped guideways for transmitting thereto the entire vertical thrusts of the tool head, one of said depending L-shaped guideways being also provided with opposed vertically disposed bearing surfaces adapted to receive the entire lateral thrusts of the tool head; means for translating said head along said guideways comprising a pinion journaled in said tool head and a cooperating rack bar embedded in one of the bearing surfaces of said last mentioned L-shaped guideway; and means for actuating said pinion, the parts being so constructed and arranged that the tangential force of said pinion acts within the plane of the bearing surface thereby to minimize the tendency to kant said tool head during translation thereof.

18. A radial drill structure combining an arm member having front and rear sides and a vertically arranged longitudinal opening formed therein, the portions of said arm member adjacent said opening being substantially box-like in section; inner and outer relatively narrow vertical guideways and upper and lower relatively narrow horizontal guideways formed on said portions along the lower longitudinal edges thereof and adapted to receive the entire vertical and lateral thrusts of a tool head; a translatable tool head member disposed within the opening in said arm and having bearing surfaces fitted to said vertical and horizontal guideways; and means for translating the tool head along said guideways, comprising an inverted rack bar imbedded in one of said lower guideways, a pinion cooperating therewith and a manually rotatable shaft member disposed below said arm and extending across the opening formed therein from front to back of the drill arm for actuating said pinion; and manually operable means located upon each end of said shaft and at opposite sides of said arm for rotating said shaft and affording means for effecting translation of the tool head along said guideways.

LAWRENCE L. SCHAUER.
AUGUSTUS M. SOSA.
JOHN H. McKEWEN.